(12) United States Patent
Ettl et al.

(10) Patent No.: US 7,044,539 B2
(45) Date of Patent: May 16, 2006

(54) MOTOR VEHICLE ROOF

(75) Inventors: Wolfgang Ettl, Graefelfing (DE); Peter Reihl, Starnberg (DE); Adam Wagner, Stockdorf (DE); Niko Graeter, Danndorf (DE)

(73) Assignee: Open Air Systems GmbH, Stockdorf (DE)

( * ) Notice: Subject to any disclaimer, the term of this patent is extended or adjusted under 35 U.S.C. 154(b) by 0 days.

(21) Appl. No.: 10/880,434

(22) Filed: Jun. 30, 2004

(65) Prior Publication Data
US 2005/0023868 A1 Feb. 3, 2005

(30) Foreign Application Priority Data
Jun. 30, 2003 (DE) ................................ 103 29 536

(51) Int. Cl.
*B60J 7/47* (2006.01)
(52) U.S. Cl. .................................. 296/216.03; 296/222
(58) Field of Classification Search ................................
296/216.02–216.05, 221–223
See application file for complete search history.

(56) References Cited
U.S. PATENT DOCUMENTS 4,709,959 A * 12/1987 Paerisch et al. ............ 296/217
5,558,388 A * 9/1996 Furst et al. ............... 296/107.2
6,669,276 B1* 12/2003 Eiermann et al. ....... 296/216.02
6,799,796 B1* 10/2004 Radmanic .............. 296/216.08

FOREIGN PATENT DOCUMENTS
DE 197 13 347 C1 5/1999

* cited by examiner

*Primary Examiner*—Dennis H. Pedder
(74) *Attorney, Agent, or Firm*—David S. Safran

(57) ABSTRACT

A motor vehicle roof is provided which includes a cover which can be moved into a raised position at its rear edge by a carriage which can be moved along guide rails in interaction with a cover carrier connected to the cover via a crank arrangement. The crank arrangement has at least one crank path and at least one sliding element which fits into the crank arrangement. For simple and reliable support of the cover in all phases, the crank arrangement preferably includes at least two crank paths and two sliding elements, wherein the crank paths are shaped and arranged such that when the carriage moves, a first sliding element assumes support of the cover in the direction of the height of the vehicle roof (Z-direction), while a second sliding element applies support in the lengthwise direction of the vehicle (X-direction). As the carriage continues to be displaced, a reversal of the supporting action of the two sliding elements occurs.

11 Claims, 3 Drawing Sheets

MOTOR VEHICLE ROOF

BACKGROUND OF THE INVENTION

1. Field of the Invention

The present invention relates to a motor vehicle roof having a cover with a rear edge movable into a raised position, a carriage adapted to move the cover into the raised position and a cover carrier connected to the cover via a crank arrangement. Specifically, the present invention relates to such a roof wherein the carriage is moveable along guide rails in interaction with the cover carrier and the crank arrangement includes at least one crank path and at least one sliding element which fits into the at least one crank path.

2. Description of Related Art

A conventional a motor vehicle roof with an externally guided cover is disclosed in German published patent application 197 13 347 A1. In that arrangement, a carriage, which can be moved by a driving cable, displaces the lower coupling point of a raising lever. The raising lever is guided in the middle with a sliding element in a stationary crank path and its top end is movably guided with another sliding element in a crank path on a cover carrier. The support of the rear edge of the cover when the cover is being moved is assumed by a supporting lever which is provided independently of the raising lever. This mechanism requires very exact production and mounting of all involved components and a large amount of space, viewed in the width of the vehicle (Y direction), due to the required transfer from the raising lever to the supporting lever.

SUMMARY OF THE INVENTION

One object of the present invention is to provide a motor vehicle roof which ensures narrow, simple and reliable support of the cover in all phases of motion.

This object, and other objects, are achieved by providing a motor vehicle roof comprising a cover having a rear edge and movable into a raised position at the rear edge, a carriage adapted to move the cover into the raised position and a cover carrier connected to the cover via a crank arrangement. The carriage moveable along guide rails in interaction with the cover carrier. The crank arrangement includes at least two crank paths and first and second sliding elements which fit into respective crank paths. The at least two crank paths are shaped and arranged to cause the first sliding element to support the cover in the direction of the height of the vehicle roof (Z-direction) upon movement of the carriage, while also causing a second sliding element to apply support to the cover in the lengthwise direction of the vehicle (X-direction). The direction of the support provided by the first and the second sliding elements is reversed upon further displacement of the carriage.

Because two sliding elements are arranged and shaped such that, when the carriage moves in a sliding transition, the elements alternately assume support of the cover in the direction of the height of the motor vehicle roof (Z direction) and in the lengthwise direction of the motor vehicle roof (X direction), displacement during the raising motion of the rear edge by one of the sliding elements is likewise prevented. Thus, reliable entrainment and support of the cover during its displacement are ensured.

Advantageously, at least one crank path is formed on the carriage and at least one crank path is formed on the guide rails.

According to one especially preferred embodiment, the sliding elements may be pivotally supported on the cover carrier.

The first and the second sliding elements are preferably located in the front area of the cover carrier. In this way, the motion of the front edge of the cover can be controlled such that it is slightly raised during opening and is shifted slightly to the rear so that there is no collision with the front seal.

In a preferred embodiment, in the projection in the transverse direction of the motor vehicle, the crank paths for the first sliding element and the second sliding element cross.

For especially reliable support and to control the rear edge of the cover as necessary, it is advantageous that the crank arrangement comprises a third sliding element guided in a third crank path. Preferably, the third sliding element is located in the rear area of the cover carrier.

The first sliding element and the second sliding element are made in an especially space-saving embodiment on different sides of the component which bears them.

The cover can be a component of a fixed motor vehicle roof or a component of a convertible folding top package which is preferably made exclusively of fixed elements. Such a fixed element convertible is generally known from German patent 197 13 347 C1.

One aspect of the present invention which is advantageous independently of the above described motor vehicle roof of the present invention includes at least one sliding element pivotally supported such that the sliding element changes from an essentially vertical position into an essentially horizontal position when moved in the crank path. When two sliding elements are used, they are supported such that while the first sliding element is changing from the vertical into the horizontal position, the second sliding element changes oppositely thereto from the horizontal into the vertical position.

DETAILED DESCRIPTION OF THE INVENTION

Figure 1:
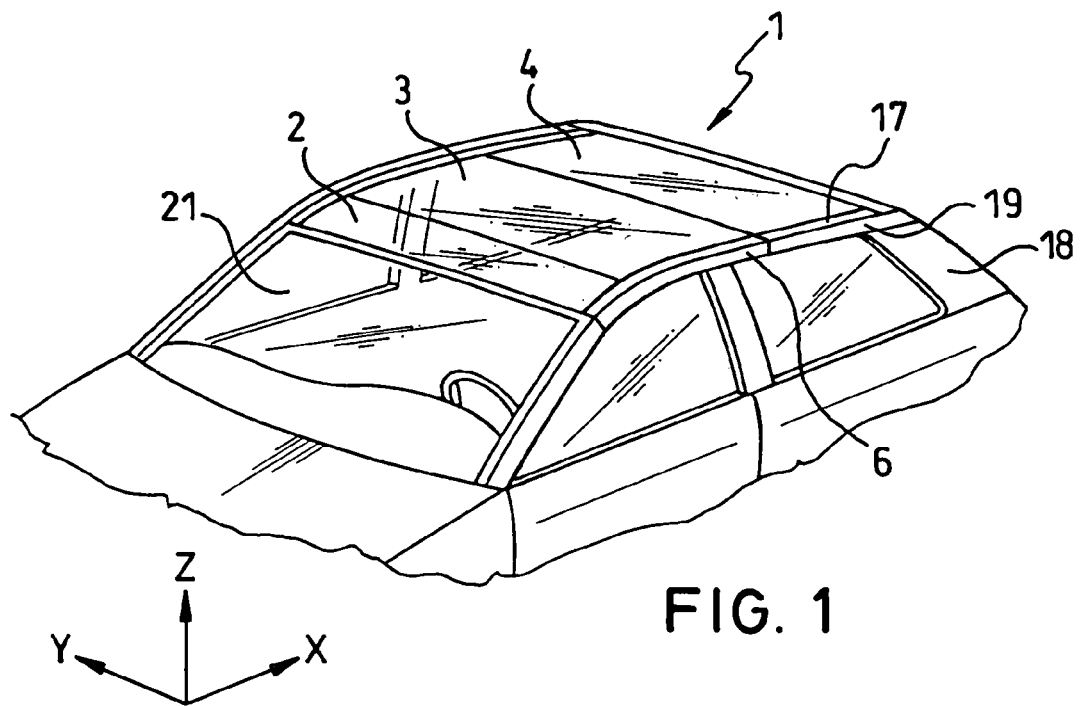
FIG. 1 shows a schematic perspective of a motor vehicle roof with a closed cover in accordance with the present invention.

The motor vehicle roof I shown in FIG. 1, following the top edge of the front window 21, is composed of a wind deflector louver 2, a cover 3, a rear cover part 4 which adjoins cover 3 to the rear, side members 6 which laterally border the cover 3 and a rear roof cassette 19 which surrounds the rear roof part 4. The motor vehicle roof 1, in this exemplary embodiment, is made as a fixed element convertible in which the cover 3 can be moved over the rear roof part 4. Also, in this embodiment, after swiveling of the side members 6, the package consisting of the cover 3, the rear roof part 4, the roof cassette 19 and C pillars 18 can be deposited in a stowage space, which is not shown, in the rear part of the vehicle. The present invention is also likewise suited for an externally guided cover 3 in a fixed motor vehicle roof.

Figure 2:
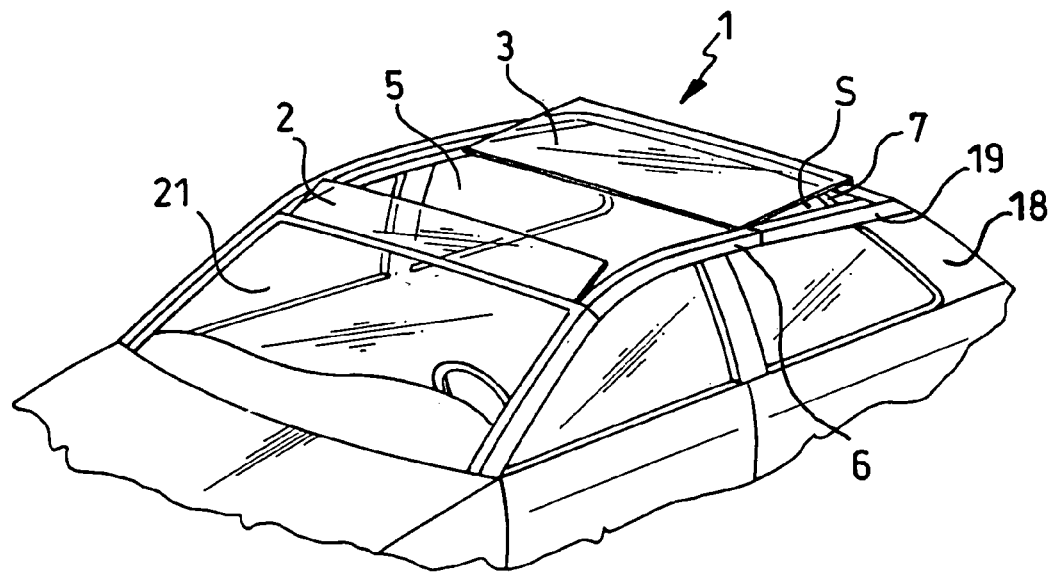
FIG. 2 shows the motor vehicle roof of FIG. 1 with the cover opened.

The optional wind deflector louver 2 can be raised preferably independently of the position of the cover 3 into the ventilator position as shown in FIG. 2. The cover 3 is connected on either side to the cover carrier 7 which is connected to the inside of the cover 3 and which extends down roughly at a right angle near the lateral outside edges of the cover 3 (see FIG. 6). The cover carrier 7 is used preferably with the rear edge of the cover raised at the same time as a lateral screen for covering the triangular lateral gap S (see FIG. 2). The cover 3, on its outside edge, has a seal 16 for sealing contact with the edge of the roof opening 5. The seal 16 however can also be attached, as shown, to the edge of the roof opening 5 so that an injection-molded plastic edge 20 on the cover 3 adjoins the seal.

A total of three sliding elements 8, 9, 10 are provided on the cover carrier 7. The three sliding elements 8, 9, 10 are each pivotally supported by means of a sliding axis on the cover carrier 7. The three sliding elements 8, 9, 10 are located roughly at the same height, i.e. at the same distance to the cover 3 near the lower edge of the cover carrier 7. The first sliding element 8 is located a short distance behind a second sliding element 9, while the third sliding element 10 is located roughly in the rear third of the cover 3.

One carriage 11 at a time is movably guided on the guide rails 15 which extend laterally from the roof opening 5. Only one of the guide rails 15 is shown in FIGS. 3–7. For this purpose, the guide rail 15 has a guide channel 1 SC. The carriage 11 is moved via a driving cable (not shown) attached to the carriage 11 and an electric motor (not shown). The driving cable itself is guided rigidly in tension and in compression in the cable channel 15D shown in FIGS. 6 and 7.

On the carriage 11, in the front area, a first guide path 12 is formed, into which the first sliding element 8 fits. The guide path 12 has a first, roughly vertically arranged path section 12A, a bent path section 12B which adjoins it to the rear, a roughly horizontal path section 12C which adjoins the latter to the rear, a path section 12D which adjoins path section 12C and descends to the rear, and a lower, roughly horizontal path section 12E. When the carriage 11 is moved to the rear, the first sliding element 8 traverses the path sections 12E, 12D, 12C, 12B, and 12A in succession proceeding from the closed position of the cover 3 as shown in FIG. 3.

Figure 6:
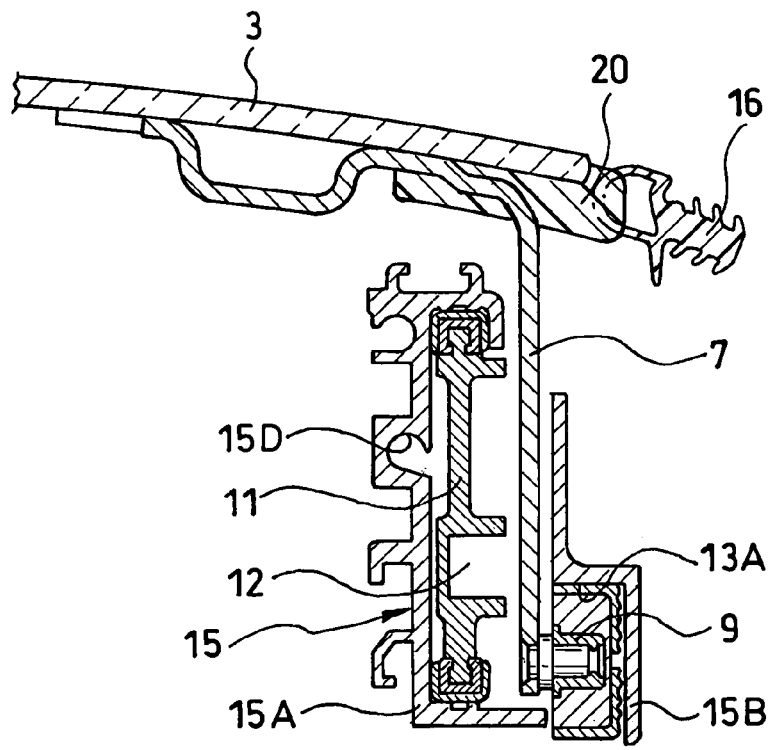
FIG. 6 shows a partial lengthwise section along the intersection line VI—VI in FIG. 3.
Figure 7:
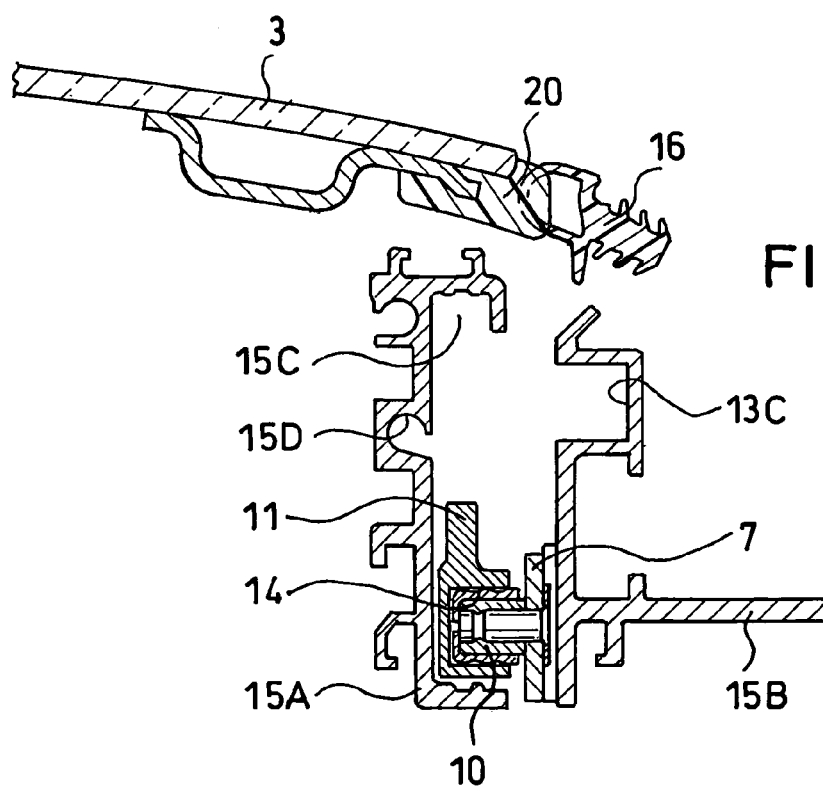
FIG. 7 shows a partial cross section along the intersection line VII—VII in FIG. 3.

The guide rail 15, as is apparent in FIGS. 6 and 7, is composed of an inner profile part 15A located near the edge of the roof opening 5 and an outer profile part 15B located near the side member 6. A second guide path 13 is made on the outer profile part 15B of guide rail 15. The guide path 13 is composed of a front path section 13A which rises steeply to the rear, a path section 13B which rises more gently to the rear, and a generally horizontal path section 13C which runs to the rear. The second sliding element 9 engages the guide path 13. When the carriage 11 is moving to the rear, the second sliding element 9 traverses the path sections 13A, 13B and 13C in succession proceeding from the closed position of the cover 3 which is shown in FIG. 3.

Near the back end of the carriage 11 on the latter, a third guide path 14 is formed on the side facing the outer profile part 15B. From back to front, this guide path is composed of a lower, generally horizontal path section 14A, a path section 14B which rises obliquely forward, and a front, generally horizontal path section 14C. The third sliding element 10 fits into the third guide path 14. When the carriage 11 is displaced to the rear, the third sliding element 10 traverses the path sections 14A, 14B and 14C in succession.

Figures 3, 4, 5:
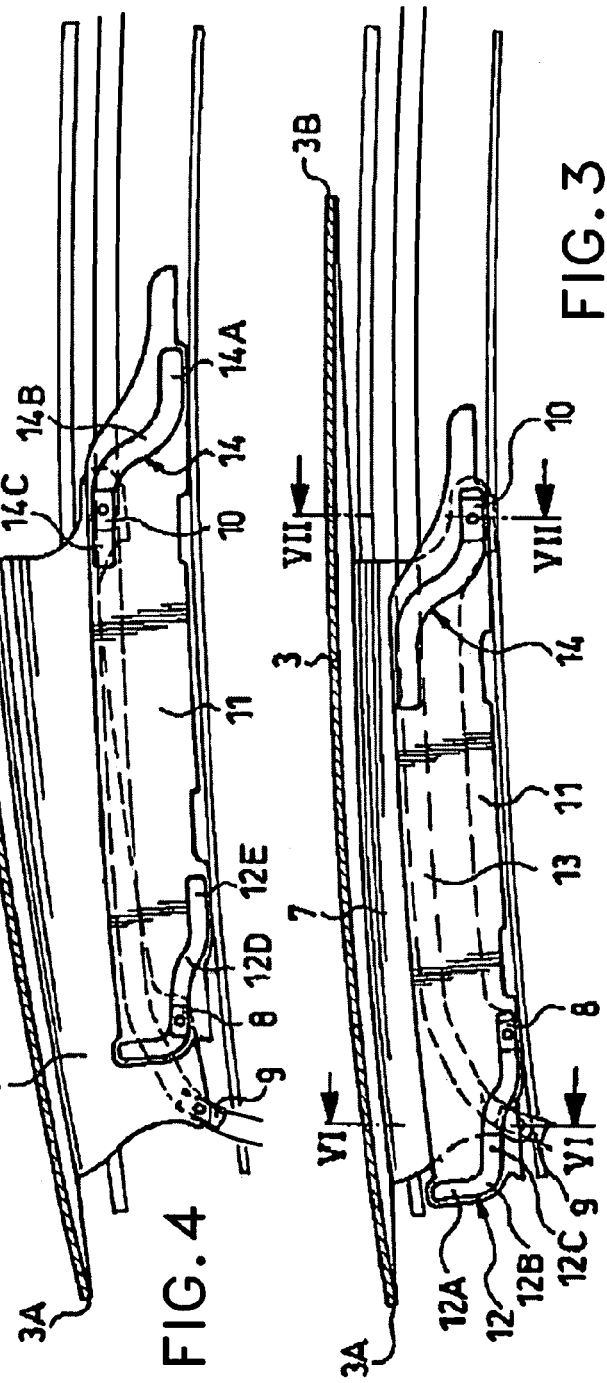
FIG. 3 shows a partial lengthwise section of the motor vehicle roof of FIG. 1 in the area of a side guide with the cover closed.
FIG. 4 shows a partial lengthwise section of the roof of the present invention with the cover raised.
FIG. 5 shows a partial lengthwise section of the roof of the present invention with the cover pushed to the rear.

FIGS. 3 to 5 show the sequence of movements of the cover 3, proceeding from the closed position of the cover 3 in FIG. 3, via the raised position as shown in FIG. 4 to the displacement position shown in FIG. 5. The interplay of the sliding elements 8, 9 and 10 with the guide paths 12, 13, 14 becomes apparent. The sliding elements 8, 9 and 10 are guided so closely in their guide paths 12, 13 and 14 that the curvature of the guide path imparts rotation to the respective sliding element when the carriage 11 is displaced.

In the closed position of the cover 3, the first sliding element 8 lies on the back end of the horizontal path section 12E of the first guide path 12. At the same time, the second sliding element 9 lies on the lower end of the front path section 13A of the second guide path 13. The third sliding element 10 lies on the back end of the rear path section 14A of the third guide path 14. The cover 3 in this position is supported by the sliding elements 8 and 10 which are aligned horizontally by the path sections 12E and 14A in the vertical direction. At the same time, it is prevented from moving to the rear by the second sliding element 9 which is aligned generally vertically as a result of the path section 13 A of the second crank guide 13 running highly vertically.

When the carriage 11 is moved to the rear to initiate the raising motion of the cover 3 with its rear edge 3B, the first sliding element 8 traverses the gently rising path section 12D and the generally horizontally running middle path section 12C. At the same time, the third sliding element 10 transverses the dramatically rising path section 14B and the initial area of the roughly horizontal path section 14C. In doing so, the cover 3, with its rear edge 3B, is raised substantially, while the front edge 3A of the cover 3 is slightly raised in order to prevent the front edge 3A of the cover from plunging too much forward or down and in doing so colliding with the seal in the area of the front edge of the roof opening 5. The movements of the sliding elements are rather matched to one another such that the front edge 3A of the cover always remains in contact with this seal, without compressing it too greatly. The second sliding element 9 migrates up in the front path section 13A, but maintains its predominantly vertical alignment so that the cover 3 undergoes only a slight displacement to the rear which is superimposed on the raising motion and which is enabled by the slant of the path section 13A, but otherwise continues to be blocked against displacement to the rear.

In the transition from the raised position as shown in FIG. 4 into the displacement position as shown in FIG. 5, the first sliding element 8 traverses the bent path section 12B, while the second sliding element 9 at the same time traverses the rising path section 13B. The first sliding element 8 is turned in this way from its horizontal position in which it supports the cover 3 in the vertical direction into a vertical position in which it prevents relative motion between the carriage 11 and the cover carrier 7 in the horizontal direction. At the same time, as the second sliding element 9 is turned more from the predominantly vertical position into a position closer to the horizontal, the second sliding element 9 releases the blockage of the displacement of the cover carrier 7 to the rear and at the same time assumes more and more the support of the cover 3 in the front area in the vertical direction. When the displacement position as shown in FIG. 5 is fully reached, the first sliding element 8 stands vertically on the top end of the path section 12A. The third sliding element 10 lies almost on the front end of the path section 14C. The second sliding element 9 slides to the rear in the horizontal path section 13C along the guide rail 15. By raising the first sliding element 8 and the second sliding element 9 in the transition from FIG. 4 to FIG. 5, the front edge 3A of the cover is raised so that the tilt of the cover 3 when moved to the rear is flatter than in the raised position. In this way the wind resistance and noise generation, with the cover 3 opened, are reduced and contact between the cover 3 and the seal is cancelled.

By the interaction of the two sliding elements 8 and 9 with the crank paths 12 and 13, the cover 3 in the closed position as shown in FIG. 3 and in the raised position as shown in FIG. 4 is secured against moving to the rear by the sliding element 9 and at the same time is supported by the sliding element 8 in the vertical direction. In the transition from the raised position into the displacement position, the two sliding elements 8 and 9 change their role. The sliding element 9 assumes vertical support of the cover 3 in the forward area and the sliding element 8 interlocks the cover carrier 7 to the carriage 11 so that forced entrainment of the cover 3 to the rear takes place.

In contrast to other known mechanisms for raising and moving the cover, in the present invention, an additional locking element, which blocks the displacement of the cover to the rear in the closed position and the raised position, can be completely abandoned. The mechanism of the present invention is made simple, durable and very narrow (in the y direction) and can be economically produced since it completely dispenses with additional raising or supporting levers and the mechanism necessary for this purpose.

We claim:

1. A motor vehicle roof, comprising:
   a cover having a rear edge and movable into a raised position at said rear edge;
   a carriage for moving the cover into the raised position;
   a cover carrier connected to the cover, and the carriage being connected to the cover carrier via a guide arrangement, said carriage being moveable along a guide rail in interaction with the cover carrier, said guide arrangement having at least two guide paths and first and second sliding elements which fit into respective guide paths, said at least two guide paths being shaped and arranged to cause said first sliding element to support the cover in the direction of the height of the vehicle roof (Z-direction) upon movement of the carriage, while also causing the second sliding element to apply support to the cover in the lengthwise direction of the vehicle (X-direction), wherein the direction of the support provided by said first and said second sliding elements is substantially reversed upon further displacement of the carriage by a substantial reversal of the orientation of the first and second sliding elements with respect to each other.

2. The motor vehicle roof of claim 1, wherein at least one guide path of said at least two guide paths is made on the carriage.

3. The motor vehicle roof of claim 1, wherein at least one guide path of said at least two guide paths is made on the guide rail.

4. The motor vehicle roof of claim 1, wherein said first and said second sliding elements are pivotally supported on the cover carrier.

5. The motor vehicle roof of claim 1, wherein the first and the second sliding elements are located in a front area of the cover carrier.

6. The motor vehicle roof of claim 1, wherein said at least two guide paths for the first sliding element and the second sliding element cross in a projection in a transverse direction of the motor vehicle (Y-direction).

7. The motor vehicle roof of claim 1, wherein the guide arrangement further includes a third sliding element guided in a third guide path.

8. The motor vehicle roof of claim 7, wherein the third sliding element is located in a rear area of the cover carrier.

9. The motor vehicle roof of claim 1, wherein the first sliding element (8) and the second sliding element (9) are provided on different sides of the cover carrier.

10. A motor vehicle roof, comprising:
    a cover having a rear edge and movable into a raised position at said rear edge;
    a carriage for moving the cover into the raised position;
    a cover carrier connected to the cover via a guide arrangement, said carriage moveable along guide rails in interaction with the cover carrier, said guide arrangement having at least one guide path and at least one sliding element which fits into said at least one guide path, wherein said at least one sliding element is pivotally supported to change from an essentially vertical position into an essentially horizontal position when moved in the at least one guide path;
    wherein said at least one sliding element includes a first sliding element and a second sliding element supported such that, when moved in respective guide paths, the first sliding element changes from the essentially vertical position into the essentially horizontal position, while at the same time the second sliding element changes in an opposite direction from the essentially horizontal position into the essentially vertical position.

11. The motor vehicle roof of claim 10, wherein the cover carrier is shaped to close a resulting triangular gap (S) when the cover is raised as a lateral screen.

* * * * *